NOISE ELIMINATION SYSTEM FOR PULSE SIGNAL RECEIVERS

Filed Aug. 8, 1945 2 SHEETS—SHEET 1

Inventors
GAROLD K. JENSEN
CARL M. RUSSELL
VIGO N. SMITH
By Ralph L Chappell
Attorney May 27, 1952 G. K. JENSEN ET AL 2,597,870

NOISE ELIMINATION SYSTEM FOR PULSE SIGNAL RECEIVERS

Filed Aug. 8, 1945 2 SHEETS—SHEET 2

Inventors
GAROLD K. JENSEN
CARL M. RUSSELL
VIGO N. SMITH

By Ralph L Chappell
Attorney

Patented May 27, 1952 2,597,870

UNITED STATES PATENT OFFICE 2,597,870

NOISE ELIMINATION SYSTEM FOR PULSE SIGNAL RECEIVERS

Garold K. Jensen, United States Navy, Carl M. Russell, Washington, D. C., and Vigo N. Smith, Oakland, Calif.

Application August 8, 1945, Serial No. 609,691

1 Claim. (Cl. 250—20)

(Granted under the act of March 3, 1883, as amended April 30, 1928; 370 O. G. 757)

This invention relates to a method of and means for suppressing random noise signals from the output of a radio receiving system.

An object of this invention is to provide a means for suppressing random noise signals from the output of an ordinary pulse type receiver system.

Another object of this invention is to provide a means for generating an automatic volume control voltage, for varying the gain of a radio receiver system in such a manner that the amplitude of the desired output signal will remain unaffected by the general noise level.

Other objects and features of the present invention will become apparent upon a careful consideration of the following detailed description when taken together with the accompanying drawings.

Figure 1:
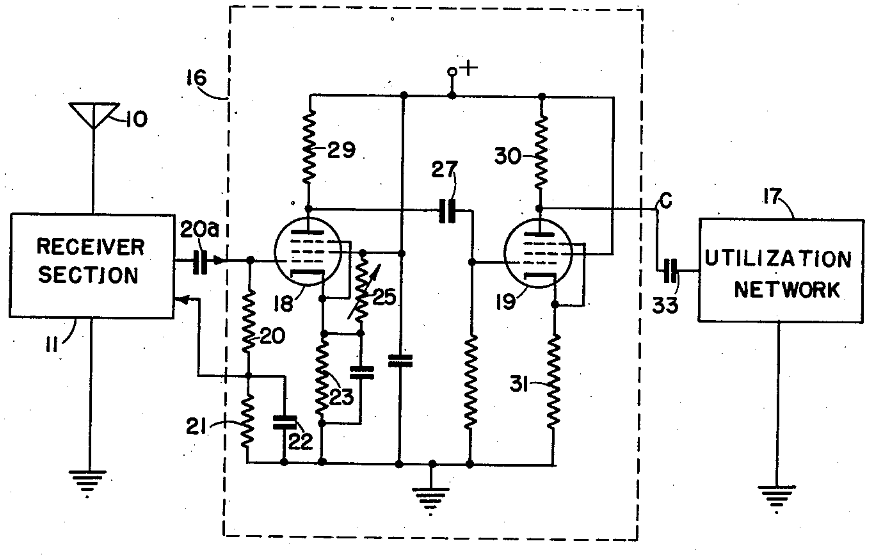
Figure 2:
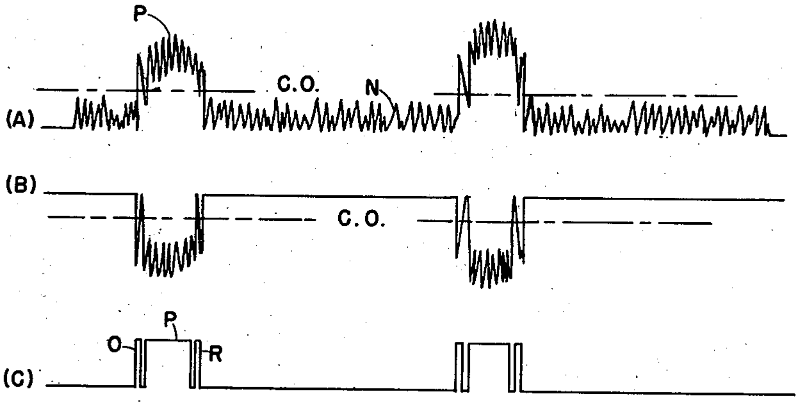
Figure 3:
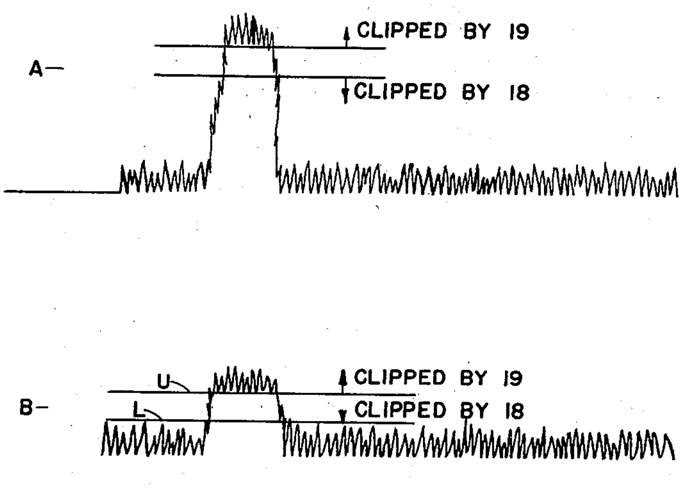

Fig. 1 is a schematic diagram, partly in block, of one embodiment of the invention; and Figs. 2 and 3 show a series of waveforms which are useful in explaining the operation of the circuits shown in Fig. 1.

For purposes of illustration, the system of the invention is shown in Fig. 1 as incorporated in an ordinary pulse type radio receiving system. Included in the receiving system are a suitable antenna 10, a receiver section 11 which may comprise a suitable number of pre-amplifier and detector stages, the apparatus of the invention, indicated in general at 16, and a utilization network 17. The latter may be any suitable network which is adapted to function in response to pulse signals. The receiver section may be either an ordinary tuned-radio-frequency or a super-heterodyne type.

Both random noise signals and bursts of radio frequency energy emitted by a distant transmitter to which the receiving system is tuned are picked up by the antenna 10 and are amplified and detected in the receiver section 11. The output from this section may appear for example, similar to that shown by waveform A of Fig. 2. As illustrated by this waveform, the output from the receiver section 11 is unipolar, preferably positive, and consists of the desired pulse signal P emitted from a distant transmitter and a moderately high level of noise N.

The circuit of the invention is shown as comprising two vacuum tube stages 18 and 19 through which the output from the receiver section 11 must pass to the utilization network 17. Stage 18 functions to reject all received signals below a first predetermined level and stage 19 functions to limit all received signals above a second predetermined level. Stage 18 is biased beyond cut-off by means of its cathode connection to the juncture point of resistances 23 and 25 which are connected in series between B+ and ground. The cut-off bias C. O. for tube 18 is superposed on waveform A of Fig. 2 and may be moved vertically from the base line of the waveform A by adjustment of the variable resistance 25. In this manner tube 18 can be made to reject all noise signals falling below the cut-off line C. O. thereby permitting tube 18 to come into conduction and hence produce an output signal only during the occurrence of pulse P. As tube 18 conducts, the surge of current through it produces a negative voltage pulse across the plate load resistance 29. The negative signals available at the plate of tube 18, as shown by waveform B of Fig. 2 no longer contain the noise originally present between the desired pulse signals since the general noise voltages are not of sufficient magnitude to overcome the cathode bias on tube 18. The noise occurring during the pulse itself, however, still appears on the signal. To eliminate this noise, the second stage 19 is normally biased conducting by way of the unbypassed cathode resistance 31. The cut-off potential C. O. for tube 19 is superposed upon waveform B. Resistance 31 is selected so that the normal operating bias on tube 19 will permit that tube to be readily cut off, therefore, noise appearing on the signal will merely drive the tube further into the non-conducting region. As tube 19 is driven to cut-off by the negative pulse signals obtained from the plate of tube 18, the plate voltage of tube 19 rises to the plate supply voltage and thus causes to appear at the plate of tube 19 a pulse somewhat as shown by waveform C of Fig. 2. As represented in waveform C, the desired pulse signal P may be accompanied by short random pulses O and R which represent noise signals occurring during the leading and trailing edges respectively of the desired pulse. Such noise pulses cannot be entirely eliminated but can be minimized if sufficient band width is provided in the previous stages so as to supply to tube 18 pulses with sharp leading and trailing edges. Generally such is the case and the extraneous pulses O and R are insignificant.

As is characteristic of most receiving systems, it is preferred to have the amplitude of the desired signal pulse and not the general noise level control the sensitivity of the receiver. For this type of operation, the coupling capacitance 20a in the grid circuit of tube 18 is arranged so that the positive pulses which appear at the output of the receiver section and which overcome the bias on tube 18 cause the flow of grid current in this tube. As grid current flow takes place during the pulse the condenser 20a becomes charged. At the conclusion of the pulse, the charge on condenser 20a is permitted to leak off through resistances 20 and 21 connected between the grid of tube 18 and ground. There is thus produced at the juncture of the resistances 20 and 21 a negative voltage which is directly proportional to the amplitude of the desired pulse signal in excess of the cathode bias of tube 18, and is ideally suited for controlling the sensitivity of the receiver according to customary automatic volume control principles. It is desired, however, that this negative automatic volume control voltage be filtered to permit smooth and reliable operation of the receiving system. For this purpose a capacitance 22 is connected between the juncture of resistances 20 and 21 and ground. The time constant circuit that this capacitance forms with the resistance 21 is chosen to be several times longer than the period between successive pulse signals. Therefore, since the voltage at the juncture of 20 and 21 is the result of the partial rectification of the peak signal, this voltage will serve mainly to produce a constant maximum output signal regardless of the general noise level.

In connection with the operation of tube 18 it should be pointed out that the cut-off level C. O. shown superposed on waveform A of Fig. 2 is not only fixed by the cathode bias for tube 18 but is also a function of the amount of charge on the grid coupling capacitance 20–a. In particular the greater the peak amplitude of the received pulse the greater the charge on the coupling capacitance. In Fig. 3 two waveforms illustrating the effects that indifferent amplitude signals have on the cut-off bias for tube 18 are shown. In waveform A a high peak amplitude signal having low level noise superposed thereon is shown. Under this condition the average grid current flow for tube 18 is high and the cut-off bias C. O. rises correspondingly. In waveform B a low level signal having low level noise superposed thereon is shown. Under this condition the average grid current flow in tube 18 is low and the cut-off bias for tube 18 drops correspondingly. As the desired signal increases in amplitude the capability of the system to reject stray signals and noise increases proportionally since the region between the two clipping levels moves up or down with variations in pulse amplitude.

Although we have shown and described a certain and specific embodiment of the present invention, we are fully aware of the many modifications possible thereof, therefore, this invention is not to be restricted except insofar as necessitated by the spirit of the prior art and the scope of the appended claim.

The invention described herein may be manufactured and used by or for the Government of the United States of America for governmental purposes without the payment of any royalty thereon or therefor.

What is claimed is:

In a pulse receiving system, a receiver having a number of amplifier stages and a detector stage, a noise reducing circuit comprising, a first amplifier means connected to the output of the detector stage biased to be driven to the extreme of grid conduction by input received signals of usable amplitude, a second amplifier means connected to the output of said first amplifier means biased to be driven into the anode current cutoff region by signals applied thereto, bias developing means for the first amplifier means responsive to grid conduction thereby to develop signal varying bias therefor, and a signal conduction path from said bias developing means to the amplifier stages of the receiver operative to vary the amplification thereof inversely in dependency on the amplitude of received signals.

GAROLD K. JENSEN.
CARL M. RUSSELL.
VIGO N. SMITH.

REFERENCES CITED

The following references are of record in the file of this patent:

UNITED STATES PATENTS

| Number | Name | Date |
|---|---|---|
| 2,061,734 | Kell | Nov. 24, 1936 |
| 2,246,939 | Holmes | June 24, 1941 |
| 2,273,098 | Foster | Feb. 17, 1942 |
| 2,277,000 | Bingley | Mar. 17, 1942 |
| 2,304,713 | Smith | Dec. 8, 1942 |
| 2,356,140 | Applegarth | Aug. 22, 1944 |
| 2,356,141 | Applegarth | Aug. 22, 1944 |
| 2,395,615 | Curtis | Feb. 26, 1946 |
| 2,428,011 | Chatterjea et al. | Sept. 30, 1947 |

FOREIGN PATENTS

| Number | Country | Date |
|---|---|---|
| 114,997 | Australia | Apr. 23, 1942 |